Figure 1:
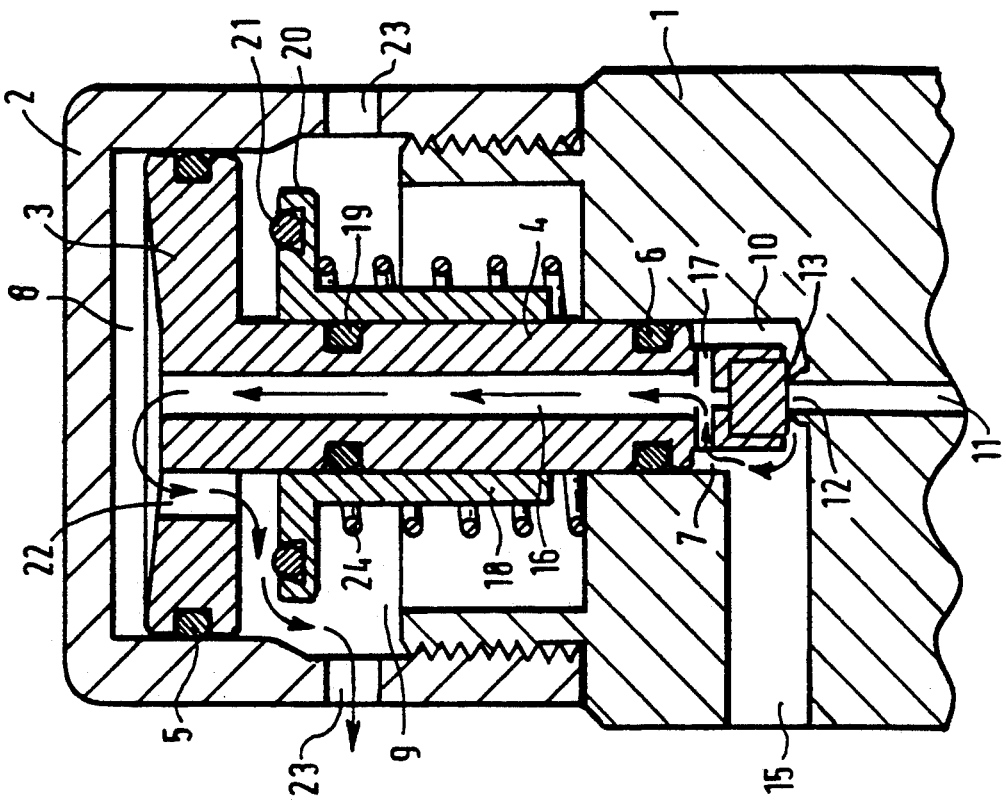

United States Patent [19]
Tatarek-Gintowt et al.

[11] Patent Number: 5,307,834
[45] Date of Patent: May 3, 1994

[54] GAS FLOW CONTROL REGULATOR

[75] Inventors: Andrew R. T. Tatarek-Gintowt, Aldershot; Michael W. Harral, Camberley, both of England

[73] Assignee: Sabre Safety Limited, United Kingdom

[21] Appl. No.: 100,304

[22] Filed: Aug. 2, 1993

[30] Foreign Application Priority Data

Aug. 5, 1992 [GB] United Kingdom ............... 9216648

[51] Int. Cl.⁵ ............................................. G05D 16/10
[52] U.S. Cl. ...................... 137/505.11; 137/116.5; 137/505.25
[58] Field of Search ............ 137/505.11, 505.25, 137/116.5

[56] References Cited

U.S. PATENT DOCUMENTS

| | | | |
|---|---|---|---|
| 3,848,631 | 11/1974 | Fallon | 137/505.11 |
| 4,020,863 | 5/1977 | Fabish | 137/116.5 |
| 4,655,246 | 4/1987 | Phlipot et al. | 137/505.11 |

FOREIGN PATENT DOCUMENTS 737198  9/1955  United Kingdom .

*Primary Examiner*—Robert G. Nilson
*Attorney, Agent, or Firm*—Bacon & Thomas

[57] ABSTRACT

In a combined gas flow control regulator and pressure relief valve, the pressure relief valve includes a pressure relief member comprising a flange and a sleeve which is sealingly engaged with the piston rod of the gas flow control regulator and is slidable relative to the piston rod. A spring urges the flange of the pressure relief member into contact with the piston head of the gas flow control regulator thereby closing a gas relief aperture in the piston head capable of connecting a first chamber, which is one chamber of the gas flow control regulator to a second chamber which is a gas relief chamber from which gas can escape to atmosphere. The pressure relief member moves as one with the piston of the gas flow control regulator in normal operation of the gas flow control regulator, and the pressure relief member moves away from the piston head against the action of the spring, independently of the motion of the piston, when excess pressure builds up within the regulator body, to allow this excess pressure to be vented to atmosphere through the second chamber.

1 Claim, 1 Drawing Sheet

GAS FLOW CONTROL REGULATOR

This invention relates to a gas flow control regulator for receiving gas from a high pressure source and supplying the gas at a low pressure to the user. Such gas flow control regulators have particular application in the medical field, for example in hospitals where oxygen or other breathing gas from a high pressure gas cylinder is to be supplied through tubes capable of withstanding only pressure below 200 pounds for use by a patient.

Such gas flow control regulators are used in association with a pressure relief device which has conventionally been a separate device from the gas flow control regulator with the result that both the regulator and the pressure relief device have to be connected to the outlet from the gas cylinder.

A combined gas flow control regulator and pressure relief valve is disclosed in U.S. Pat. No. 4,655,246. It is an object of the present invention to provide a gas flow control regulator which includes a pressure relief valve within the same body as the regulator but which has advantages in comparison with the device of U.S. Pat. No. 4,655,246.

According to the present invention there is provided a gas flow control regulator comprising a regulator body, a piston including a piston head and a piston rod within the regulator body, the piston head and the piston rod both being in sealing engagement with portions of the regulator body to divide the interior of the regulator body into three chambers, a first chamber which is a sealed chamber between the piston head and one end of the regulator body, a second chamber between the piston head and the portion of the regulator body within which the piston rod is sealingly engaged and a third chamber beyond the piston rod, an aperture in the regulator body connecting the second chamber to atmosphere, a gas inlet communicating with the third chamber for passing gas at high pressure from a source thereof to the third chamber, the piston having a valve seat thereon for sealing against the gas inlet in the third chamber, a gas conduit within the piston rod connecting the third chamber to the first chamber, a gas outlet from the third chamber for passing low pressure gas from the regulator body to a user, a pressure relief valve member including a sleeve sealingly engaged with the piston rod within the second chamber and slidable relative to the piston rod, spring means within the second chamber and acting between the regulator body and the pressure relief member to urge the pressure relief member into contact with the piston head and, in normal operation of the regulator, to close an aperture in the piston head capable of connecting the first chamber to the second chamber, whereby the piston and the pressure relief member move as one in normal operation of the regulator, the pressure relief member being movable away from the piston head against the action of the spring means to vent excess pressure within the regulator body to atmosphere through the second chamber.

Figure 2:
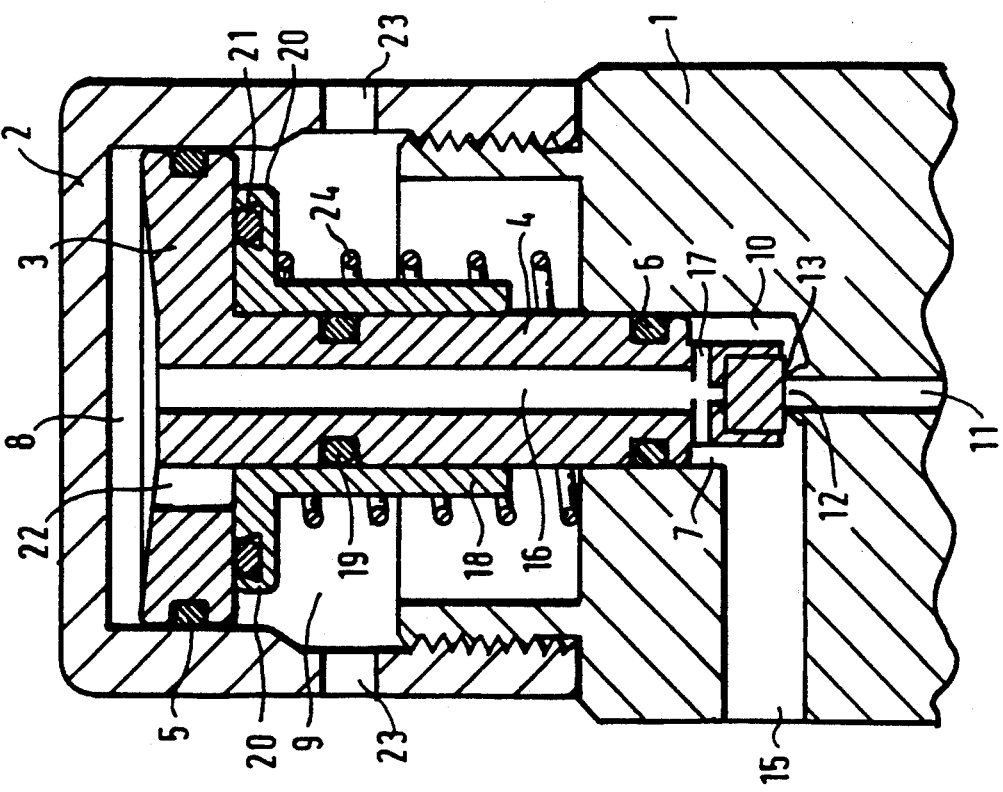

The present invention will be better understood from the following detailed description of a preferred embodiment thereof which is made by way of example with reference to the accompanying drawings in which FIG. 1 is a cross-sectional elevation of a gas flow control regulator incorporating a pressure relief valve in accordance with the present invention showing the normal position of the pressure relief valve, and FIG. 2 is a similar view of the gas flow control regulator of FIG. 1 showing the pressure relief valve opened to vent excess pressure to atmosphere.

Referring to FIG. 1 of the drawings there is shown a gas flow control regulator having a regulator body comprising portions 1 and 2, portion 1 being a substantially solid portion and portion 2 being a substantially hollow cap secured to the substantially solid portion 1.

Located axially within the regulator body formed by portions 1 and 2 there is a piston including a piston head 3 and a piston rod 4. The piston head 3 is in sealing engagment through o-ring 5 with the interior surface of portion 2 of the regulator body and the piston rod 4 is in sealing engagement through o-ring 6 with a channel 7 formed in the substantially solid portion 1 of the regulator body. The interior of the regulator body is thus divided into three chambers, a first chamber 8 between the piston head 3 and the end of the regulator body defined by the portion 2, a second chamber 9 between the piston head 3 and the substantially solid portion 1 of the regulator body and a third chamber 10 within the solid portion 1 of the regulator body below the end of the piston rod 4.

A gas inlet 11 communicates with the third chamber 10 for passing gas at high pressure from a source thereof such as a gas cylinder to the third chamber 10. The portion 1 of the regulator body includes means connecting the regulator body to the outlet of gas cylinder which is conventional and has been omitted from the figures of the accompanying drawings. The gas inlet 11 to the third chamber 10 terminates in a gas jet 12 which is engaged by a valve seat 13 mounted on the piston rod 4 to prevent entry of gas from the gas cylinder into the third chamber 10 when no low pressure gas is being withdrawn from the third chamber 10 through outlet 15.

Within the piston rod 4 there is an axial gas conduit 16 which connects the third chamber 10 to the first chamber 8, the gas conduit 16 communicating with the third chamber 10 through a cruciform-configured passage 17.

A pressure relief member comprises a sleeve 18 of a diameter such as to be capable of sliding on the external surface of piston rod 4 and in sealing engagement with the piston rod 4 as a result of the presence of o-ring 19. The pressure relief member additionally includes a flange 20 which is in sealing engagement with the surface of the piston head 3 bounding the second chamber 9 through O-ring 21.

The piston head 3 has an aperture 22 extending through it from the first chamber 8 to the second chamber 9, this aperture 22 being closed as shown in FIG. 1 during normal operation of the gas flow control regulator. The second chamber 9 is vented to atmosphere through apertures 23 in the walls of portion 2 of the regulator body.

A coiled compression spring 24 bears against the portion 1 of the regulator body and against the flange 20 of the pressure relief member to urge the pressure relief member towards the piston head 3 to maintain the pressure relief member in contact with the piston head 3 so that the piston and the pressure relief member move as one unit in normal operation of the gas flow control regulator, that is to say in the absence of undesired excess pressure.

In such normal operation of the gas flow control regulator the valve member 14 and piston are raised a small distance from the gas inlet 12 to permit gas to pass from the high pressure source into the third chamber 10 and through the passage 17 and gas conduit 16 to the first chamber 8. Aperture 22 being closed by the flange 20 of the pressure relief member, a pressure is created in the first chamber 8 which acts on the piston head 3 to counter balance the forces exerted on the piston by the spring 24 and the gas pressure in the third chamber 10 which acts on the small areas of the valve seat 13 and piston rod 4. Accordingly gas at a low pressure is provided through outlet 15 causing the piston to move up and down to open and close the gas jet 12 in the third chamber 10.

As the piston moves up and down as flow is drawn from the outlet 15, the pressure relief member moves up and down with the piston.

In the event of malfunction, for example due to o-ring 6 seizing or the valve seat 13 being damaged so that there is a continuous leak of high pressure gas from the gas jet 12, the piston will not move and an undesired high pressure will be created in the third chamber 10 and the first chamber 8. Such undesired high pressure is relieved by movement of the pressure relief member comprising flange 20 and sleeve 18 away from the piston head 3 against the action of the spring 24 enabling the excess pressure to escape through aperture 22 into the second chamber 9 and thence through apertures 23 to atmosphere as shown by the arrows in FIG. 2. All of gas conduit 16, aperture 22 and aperture 23 should be large enough in diameter to pass the greatest anticipated flow caused by excess pressure within the regulator body.

As soon as the excess pressure has been relieved, the spring 24 can return the pressure relief member to the sealing position in which the flange 20 of the pressure relief member again closes the aperture 22 and the second chamber 9 is sealed from the first chamber 8.

The arrangement in accordance with the present invention provides a pressure relief member which moves relative to the piston totally independently of the motion of the piston. The pressure relief member will therefore still operate to provide relief of excess pressure when the piston is unable to move due, for example, to the o-ring 6 seizing up.

In the device of the present invention the piston is directly in contact with the portion 1 of the regulator body thereby improving the alignment of the valve seat 13 on the piston with the gas jet 12. Relative movement between the gas jet 12 and valve seat 13 is thus reduced and sealing efficency is maintained longer than in the previously proposed device.

Alignment of the sealing area of o-ring 21 and the piston head 3 is independent of the securing of the cap portion 2 of the regulator body to the substantially solid portion 1 by screw threads. The alignment is therefore more consistent and allows lower tolerances in manufacture without introducing deterioration in pressure relief performance.

The construction of the gas flow control regulator of the present invention is such that existing piston type regulators may be converted into gas flow control regulators including pressure relief members by simple substitution of a piston and pressure relief valve member as herein described. Such retrofitting of existing piston type regulators cannot be done with the device of U.S. Pat. No. 4,655,246 without modification of the regulator body.

We claim:

1. A gas flow control regulator comprising a regulator body, a piston including a piston head and a piston rod within the regulator body, the piston head and the piston rod both being in sealing engagement with portions of the regulator body to divide the interior of the regulator body into three chambers, a first chamber which is a sealed chamber between the piston head and one end of the regulator body, a second chamber between the piston head and the portion of the regulator body within which the piston rod is sealingly engaged and a third chamber beyond the piston rod, an aperture in the regulator body connecting the second chamber to atmosphere, a gas inlet communicating with the third chamber for passing gas at high pressure from a source thereof to the third chamber, the piston having a valve seat thereon for sealing against the gas inlet in the third chamber, a gas conduit within the piston rod connecting the third chamber to the first chamber, a gas outlet from the third chamber for passing low pressure gas from the regulator body to a user, a pressure relief valve member including a sleeve sealingly engaged with the piston rod within the second chamber and slidable relative to the piston rod, spring means within the second chamber and acting between the regulator body and the pressure relief member to urge the pressure relief member into contact with the piston head and, in normal operation of the regulator, to close an aperture in the piston head capable of connecting the first chamber to the second chamber, whereby the piston and the pressure relief member move as one in normal operation of the regulator, the pressure relief member being movable away from the piston head against the action of the spring means to vent excess pressure within the regulator body to atmosphere through the second chamber.

* * * * *